Figure 1:
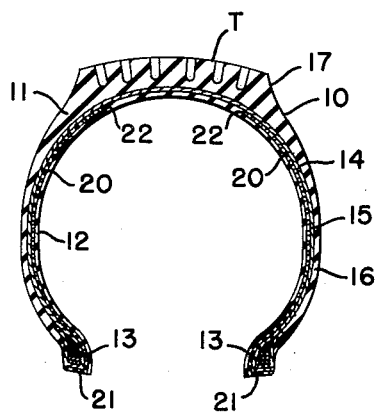

Jan. 12, 1965 J. G. MANCHETTI ETAL 3,165,138

TIRE

Filed Nov. 5, 1962

INVENTOR.
JOSEPH G. MANCHETTI
BY HERBERT B. HINDIN

*Arthur L. Whinston*

ATTORNEY.

3,165,138
TIRE
Joseph G. Manchetti, St. Clair Shores, and Herbert B. Hindin, Southfield, Mich., assignors to United States Rubber Company, New York, N.Y., a corporation of New Jersey
Filed Nov. 5, 1962, Ser. No. 235,239
3 Claims. (Cl. 152—354)

This invention realtes to pneumatic tire casings and, more particularly, to such casings reinforced with plies the individual cords of which extend radially from bead to bead.

Tire casings have been fabricated with radially extending cord fabric plies. Experience has shown, however, that with tires so reinforced, the air-retaining rubber liner therein tends to flow outwardly between the radially extending cords, thereby to damage the tire. This has been found especially true with single ply tires and, to a lesser degree, with multiple ply radially reinforced casings. The extrusion of the rubber liner between the radially extending cords may take place during cure of the tire due to the high internal pressures and high temperatures used in the process. It may also occur during use due to the pressures and/or temperatures met in service.

The problem has occurred with both tubeless tires and tires in which separate tubes are used. In the case of tubeless tires the air-retaining liner is forced outwardly between the radially extending cords. In tubed tires, it has been found that the inner tube forces the rubber coating on the inner surface of the carcass outwardly, thereby to bare the innermost surface of the reinforcing ply.

Accordingly, it is the object of the present invention to prevent such extrusion between radially extending cords. The object is accomplished in a pneumatic tire casing comprising a rubber carcass having sidewalls terminating in shoulders at the tread portion thereof, an air-retaining liner therein, circumferentially extending beads at the inner edges of said carcass, and at least one cord reinforcing ply in said carcass, the individual cords of which extend substantially radially from bead to bead, by placing a piece of bias-cut fabric material in said carcass preferably interiorly of said radially extending cords, so that the filaments of said fabric material form an angle with said radially extendnig cords, at least one edge of said piece of fabric material being left unanchored to said beads, said unanchored edge of said frabic material thereby remaining free during shaping of the tire. This freedom allows the filaments in the bias-cut fabric material to be distributed smoothly at an angle to the radially extending cords. Use of bias-cut fabric material so placed prevents the air-retaining liner from being forced outwardly between the radially extending cords of the primary reinforcement. The invention contemplates that one or more layers of bias-cut fabric material may be so used depending on the type of tire carcass and the use to which it is to be put. The term "air-retaining liner" is used herein to include the innermost rubber layer in a tubed tire. By "substantially radially" we mean to include tire cord angles which may vary slightly from 90° as, for example, cord angles in the range from 75° to 90°.

Figure 2:
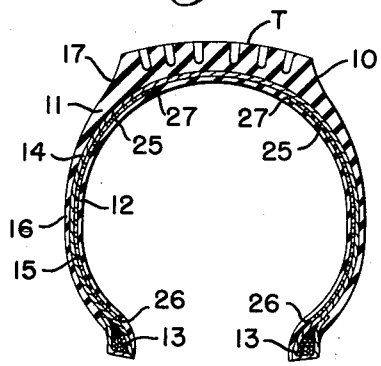

The invention will now be more particularly described, with reference to the following drawings, in which FIG. 1 is a cross-sectional view of a pneumatic tire casing reinforced with one radially extending cord reinforcing ply and having a piece of bias-cut fabric material placed in each of the sidewalls thereof, each of the pieces of fabric material being anchored at its lower edge around its respective bead, the upper edge extending only to the respective shoulder;

FIG. 2 is a cross-sectional view of a similarly reinforced tire casing having a piece of bias-cut fabric material placed in each of the sidewalls thereof, each of the pieces of fabric material extending from above the respective bead to the respective shoulder.

Figure 3:
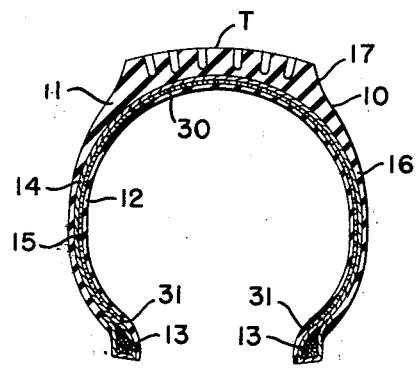
Figure 4:
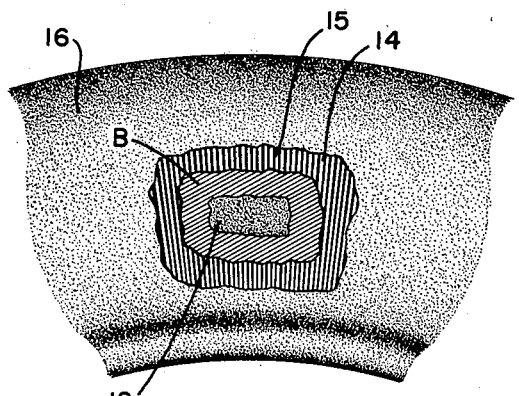

FIG. 3 is a cross-sectional view of a similarly reinforced tire casing having a piece of bias-cut fabric material extending transversely of the carcass from above one bead to above the other bead with both edges free; and FIG. 4 is a side view of a similarly reinforced tire casing, with parts broken away, shownig the angular relationship of the cords of the tire and the filaments of the fabric material.

Referring to the drawings and in particular to FIG. 1, there is shown a pneumatic tire casing 10 having a rubber carcass 11, an air-retaining liner 12 therein, circumferentially extending beads 13—13 at the inner edges of the carcass 10, and a cord reinforcing ply 14, the individual cords 15 of which extend radially from bead 13 to bead 13. The carcass 10 has the usual sidewalls 16, which terminate in shoulders 17 at the tread portion T thereof.

FIG. 1 shows the invention with a piece of bias-cut fabric material 20 placed in each of the sidewalls 16 of of the carcass 10. Fabric material 20 is preferably placed interiorly of the radially extending cord reinforcing ply 14 to form an angle with the radially extending cords 15. The lower edge 21 of each of the pieces of fabric material 20 is wrapped or anchored around the respective bead 13, while the other edge 22 extends to the respective shoulder 17. Edges 22 remain free during shaping of the tire, thus allowing the filaments of the bias-cut fabric material 20 to be distributed smoothly at an angle to the radial cords. Fabric material 20 prevents air-retaining liner 12 from being extruded between the individual radially extending cords 15, as above described.

In FIG. 2 the invention is shown in a similarly reinforced tire casing 10 and also uses pieces of bias-cut fabric material placed in each of the sidewalls of the carcass. The pieces of fabric material 25, however, extend from above the respective bead 13 to the respective shoulder 17. In that way neither the lower edges 26 nor the upper edges 27 are anchored, thereby allowing both edges to remain free during shaping.

In FIG. 3 a piece of bias-cut fabric material 30 extends transversely of the carcass 10 from above one bead 13 to above the other bead 13. In this modification both of the edges 31 are free of the beads 13.

It is to be understood, of course, that a number of plies of bias-cut fabric material may be required, depending on the purpose for which the tire is to be used. For example, in the case of radially reinforced aircraft tires, it would be necessary to use more plies of bias-cut cord fabric material to withstand the high pressures and high temperatures met in service.

FIG. 4 shows the angular relationship of the cords and filaments in tires constructed according to this invention. Specifically, there is illustrated a section of a sidewall 16 showing the air-retaining liner 12 therein and the radially extending cord reinforcing ply 14 comprised to individual cords 15 which extend radially from bead to bead. The bias-cut fabric material is generally designated by the letter B, and the filaments thereof are shown to form an angle with the radially extending cords 15. Specifically, bias angles of approximately 70° have been used, said angles being measured before shaping while the carcass is still on the building drum. We feel, however, that other angles can be utilized as well. The bias-cut filamentary fabric material B utilized for normal temperature tires has been made of nylon cord. For high temperature use, a high temperature nylon cord, such as Du Pont HT-1 has been found suitable.

While, for convenience of description, the radial reinforcing ply has been referred to as a cord reinforcing ply, it will be obvious to those skilled in the art that said ply need not be constructed of cords. The radial reinforcing ply may be of monofilament or multifilament yarns, twisted or untwisted. The radial reinforcing ply may be of rayon, metal, polyamide fibers, polyester fibers or any other suitable material. Similarly, the filamentary fabric material may be of woven or non-woven character. The individual filaments may be long or short and may also be of rayon, metal, polyamide fiber, polyester fiber or any other suitable material. If the filamentary fabric material is non-woven it is essential that the individual fibers be oriented so as to lie more or less parallel to each other.

Having thus described our invention, what we claim and desire to protect by Letters Patent is:

1. A tire comprising a rubber carcass having sidewalls terminating in shoulders at the tread portion thereof, circumferentially extending beads at the inner edges of said carcass, at least one cord reinforcing ply in said carcass, the individual cords of which extend substantially radially from bead to bead, an air retaining liner of rubber on the inner surface of the carcass and extending from bead to bead, bias-cut fabric material interposed in each of the sidewalls between said liner and said ply and co-extensive at least with said sidewalls of the carcass to resist extrusion of the rubber liner between the cords of the radial ply when the interior of the carcass is under pressure, and, one edge of said fabric material in each of the sidewalls being anchored around its respective bead, the other edge thereof extending to and terminating at the respective adjacent shoulder.

2. A tire comprising a rubber carcass having sidewalls terminating in shoulders at the tread portion thereof, circumferentially extending beads at the inner edges of said carcass, at least one cord reinforcing ply in said carcass, the individual cords of which extend substantially radially from bead to bead, an air retaining liner of rubber on the inner surface of the carcass and extending from bead to bead, bias-cut fabric material interposed in each of the sidewalls between said liner and said ply and co-extensive at least with said sidewalls of the carcass to resist extrusion of the rubber liner between the cords of the radial ply when the interior of the carcass is under pressure, and, one edge of said fabric material in each of the sidewalls extending adjacent to but free of its respective bead, the other edge thereof extending to and terminating at the respective adjacent shoulder.

3. A tire comprising a rubber carcass having sidewalls terminating in shoulders at the tread portion thereof, circumferentially extending beads at the inner edges of said carcass, at least one cord reinforcing ply in said carcass, the individual cords of which extend substantially radially from bead to bead, an air retaining liner of rubber on the inner surface of the carcass and extending from bead to bead, bias-cut fabric material interposed in each of the sidewalls between said liner and said ply and co-extensive at least with said sidewalls of the carcass to resist extrusion of the rubber liner between the cords of the radial ply when the interior of the carcass is under pressure, and, the fabric material in said sidewalls being formed as a single piece of material which extends from the region of one bead to the region of the other bead in said carcass but being free of said beads.

References Cited by the Examiner

UNITED STATES PATENTS

| | | | |
|---|---|---|---|
| 1,202,000 | 10/16 | McMahan et al. | 152—355 |
| 1,364,870 | 1/21 | Ehle | 152—356 |
| 2,703,132 | 3/55 | Darrow | 152—356 X |
| 2,754,887 | 7/56 | Wykoff | 152—354 X |
| 3,062,259 | 11/62 | Boussu et al. | 152—356 |
| 3,115,179 | 12/63 | Shepherd | 152—354 |

OTHER REFERENCES

Continental, German printed application No. 1,025,285.

ARTHUR L. LA POINT, *Primary Examiner*.